(12) United States Patent
Daoud

(10) Patent No.: US 6,409,179 B1
(45) Date of Patent: Jun. 25, 2002

(54) CABLE SEALING ARRANGEMENTS AND SEALING MEMBERS FOR USE THEREIN

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/500,714

(22) Filed: Feb. 9, 2000

(51) Int. Cl.[7] .......................... F16L 21/02; H02G 15/04
(52) U.S. Cl. ...................... 277/602; 277/603; 277/607; 277/616; 277/626; 277/630
(58) Field of Search ................................. 277/602, 603, 277/607, 616, 626, 630; 16/2.1, 2.2; 174/65; 285/419, 373

(56) References Cited

U.S. PATENT DOCUMENTS

| | | | | | |
|---|---|---|---|---|---|
| RE22,156 E | * | 8/1942 | Morris | .................. | 285/194 |
| 2,968,505 A | * | 1/1961 | Scaramucci | .................. | 288/13 |
| 3,265,399 A | * | 8/1966 | Scaramucci | .................. | 277/198 |
| 3,567,843 A | * | 3/1971 | Collins et al. | .................. | 174/51 |
| 3,617,986 A | * | 11/1971 | Becker et al. | .................. | 339/94 |
| 3,744,008 A | * | 7/1973 | Castellani | .................. | 339/89 |
| 4,289,294 A | * | 9/1981 | McLean | .................. | 251/62 |
| 4,738,636 A | * | 4/1988 | Bolante | .................. | 439/462 |
| 5,283,853 A | * | 2/1994 | Szegda | .................. | 385/139 |
| 5,543,582 A | * | 8/1996 | Stark et al. | .................. | 174/65 SS |
| 5,915,736 A | * | 6/1999 | Marik | .................. | 285/21.3 |
| 6,114,629 A | * | 9/2000 | Roush | .................. | 174/65 |

\* cited by examiner

*Primary Examiner*—Anthony Knight
*Assistant Examiner*—Matthew E. Rodgers
(74) *Attorney, Agent, or Firm*—Stroock & Stroock & Lavan LLP

(57) ABSTRACT

A cable sealing arrangement is provided for limiting the ingress of fluid into a location about a cable, such as a telephone wire enclosure, which generally includes a fitting, a sealing member, and a nut. The cable sealing arrangement provides a fluid-proof seal about a cable through radial expansion of the sealing member. Also, various slitted sealing members are provided each leaving at least one slit formed there through which allows for forced displacement of portions of the sealing member and insertion of a cable thereto. The slitted sealing members obviate the need for threading a sealing member over the entire length of a cable.

11 Claims, 18 Drawing Sheets

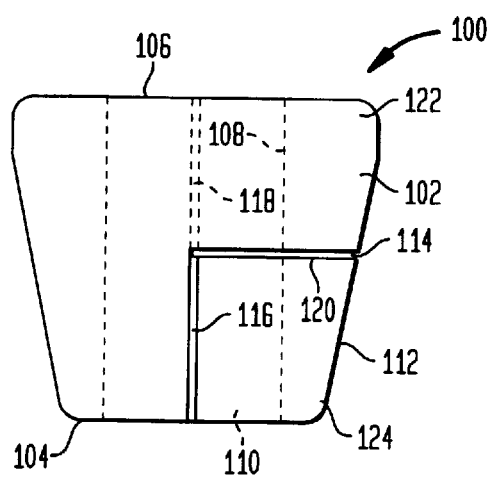
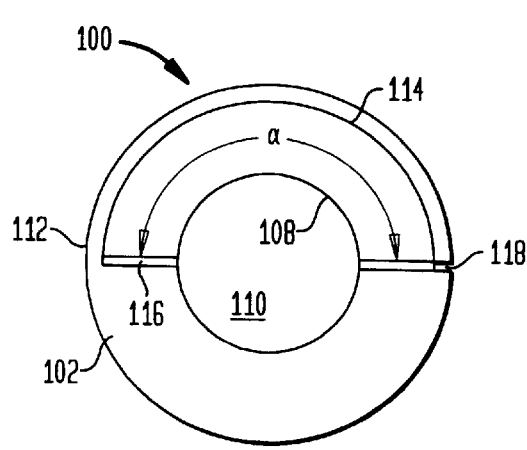
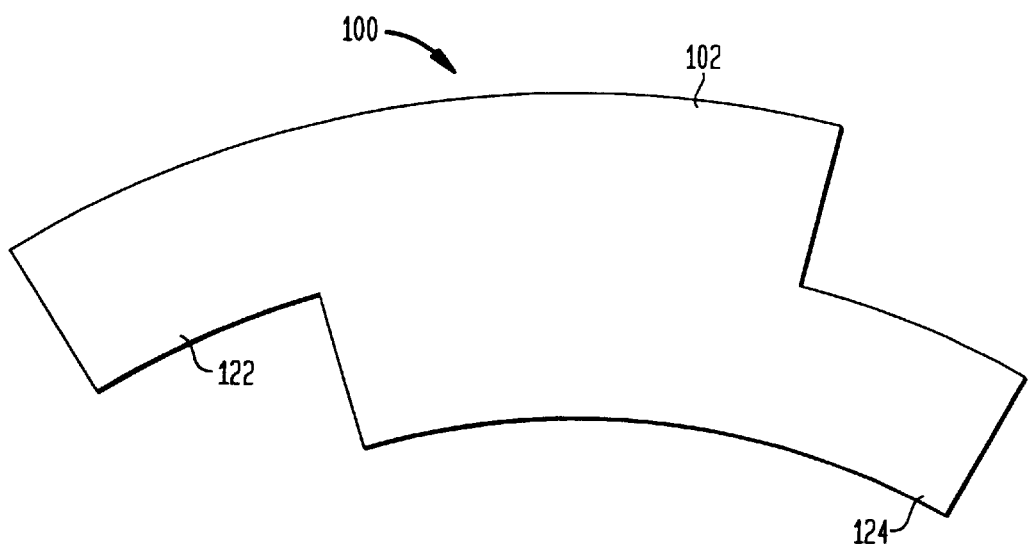

CABLE SEALING ARRANGEMENTS AND SEALING MEMBERS FOR USE THEREIN

FIELD OF THE INVENTION

This invention relates to sealing arrangements and, more particularly, to sealing arrangements for preventing the ingress of fluid into a location about a cable, such as into a telephone wire enclosure.

BACKGROUND OF INVENTION

Extensive numbers of telephone wire enclosures are located in harsh environmental settings, including sub-grade locations that are under water or susceptible to flooding. Fluid is prevalent in these settings, and there is great concern in preventing the ingress of fluid into the enclosures, which may denigrate, or altogether destroy, the telephone wire connections within the enclosure. The concern is even greater where fiber optic cables are used.

One of the most susceptible locations for fluid ingress is about a cable at the point of entry of the cable into the enclosure. To restrict the ingress of fluid into an enclosure at a cable's point of entry, seals have been used in the prior art. The various prior art seals provide different degrees of sealing over extended periods of time, depending upon such factors as the extent of plastic deformation caused by changes in temperature, excessive and/or uneven stresses, etc.

SUMMARY OF THE INVENTION

To overcome shortcomings in the prior art, a sealing arrangement and various slitted sealing members are provided for use in limiting the ingress of fluid into a location about a cable.

The sealing arrangement includes a tubular fitting, a sealing member, and a nut formed to mount onto the fitting. The sealing member has two coaxially-arranged portions, with one portion being smaller than the other portion such that an unobstructed contact surface is defined on the larger portion. The larger portion also is formed with a tapered surface that engages the fitting, preferably in shape-mating engagement, with the sealing member being at least partially disposed within the fitting. Upon tightening the nut onto the fitting, a compression surface of the nut engages the contact surface of the sealing member such that the sealing member is compressed and radially expanded to tightly press against a cable passing through the sealing member, as well as, to press tightly against the fitting, to define a fluid-proof seal about the cable.

Various slitted sealing member designs are provided, which can be modified to be used with the sealing arrangement of the subject invention, or in other sealing arrangements. First, a sealing member is provided formed with at least one slit having circumferentially-offset portions. Second, a sealing member is provided having overlapping arms. Third, a sealing member is provided which is formed by an elongated member helically wound to define a tubular body. Fourth, a sealing member is provided having at least one serpentitious slit extending its axial length. The sealing members can be used to seal one cable or simultaneously a plurality of cables. Each of the slitted sealing members have portions thereof, that are adjacent to the respective slits, which are forcibly displaceable to expose a cable-receiving channel. The cable-receiving channel may then be forced onto a cable, thereby facilitating mounting of the sealing member onto the cable, without having to thread the sealing member the full length of the cable.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 8 is a side view of a first embodiment of a slitted sealing member formed to receive a single cable;

FIG. 9 is an end view of the slitted sealing member of FIG. 8;

FIG. 10 is a plan view of the body of the slitted sealing member of FIG. 8 in a flat state;

DETAILED DESCRIPTION OF THE PREFERRED EMBODIMENTS

Figure 1:
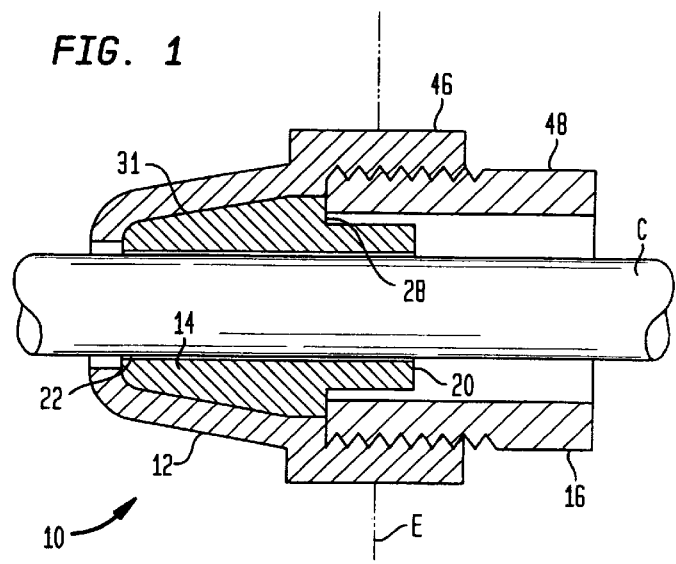
FIG. 1 is a cross-sectional view of a cable sealing arrangement formed in accordance with the subject invention.
Figure 2:
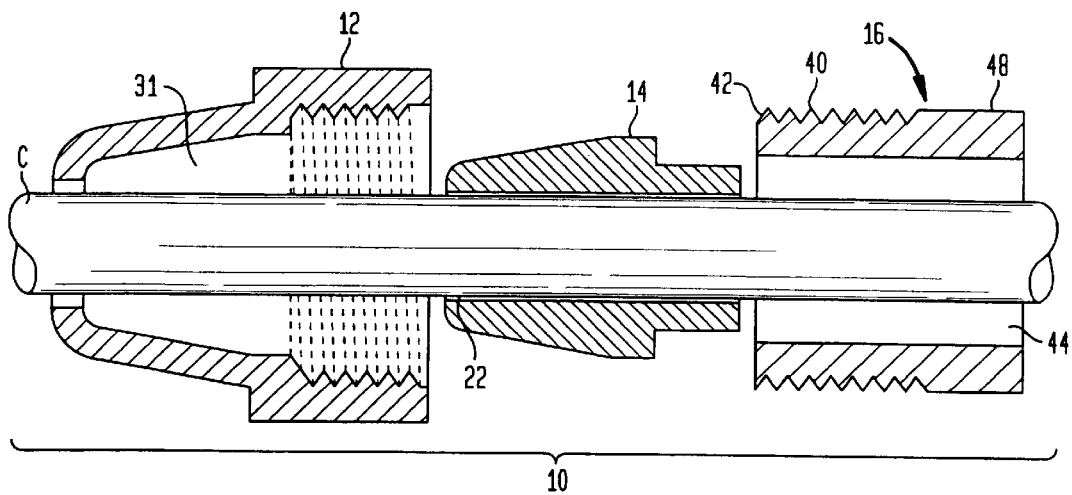
FIG. 2 is an exploded cross-sectional view of the cable sealing arrangement.

FIGS. 1 and 2 depict a sealing arrangement which is generally designated with the reference numeral 10. The sealing arrangement 10 includes a tubular fitting 12, a sealing member 14, and a nut 16.

Figure 3:
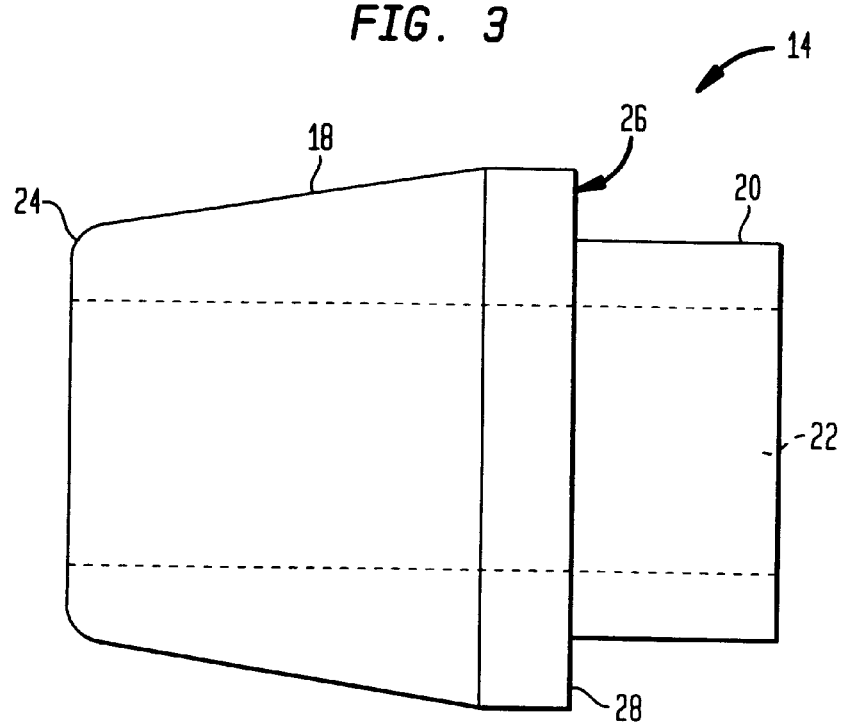
FIG. 3 is a side view of a sealing member used in the cable sealing arrangement.
Figure 4:
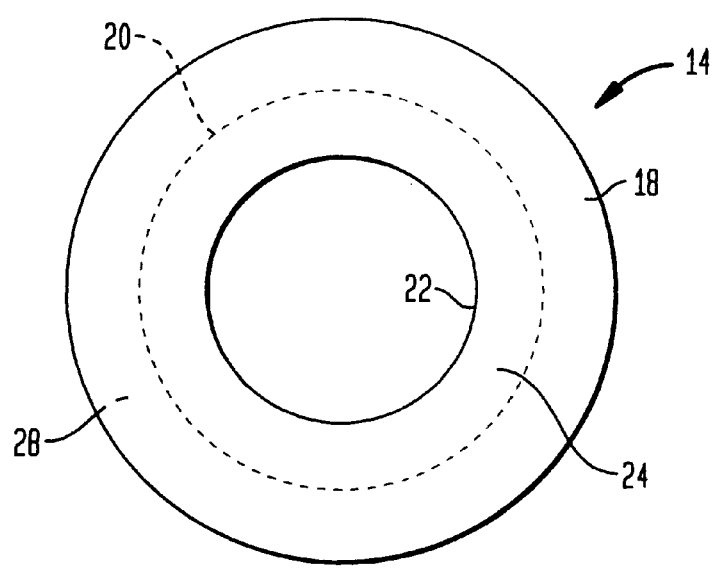
FIG. 4 is an end view of the sealing member of FIG. 3.

As most clearly shown in FIGS. 3 and 4, the sealing member 14 has a first portion 18 and a second portion 20 which are coaxially aligned along a channel 22 that extends through the sealing member 14. Preferably, the first and second portions 18, 20 are centered about the channel 22. Also, the channel 22 is sized to allow the passage there through of a cable and is preferably formed with a substantially constant cross-section. The sealing member 14 is formed of any material known to those skilled in the art which is suitable for forming a fluid-proof seal about a cable.

The first portion 18 has a front end 24 and a rear end 26. The second portion 20 extends from the rear end 26, and preferably has a cylindrical, tubular shape. It is preferred that the first and second portions 18, 20 be unitarily formed. Furthermore, the second portion 20 is formed smaller than the first portion 18 so that a portion of the rear end 26 is unobstructed to define a contact surface 28 that encircles the interface of the first and second portions 18, 20. Preferably, the contact surface 28 is annular shaped.

Figure 5:
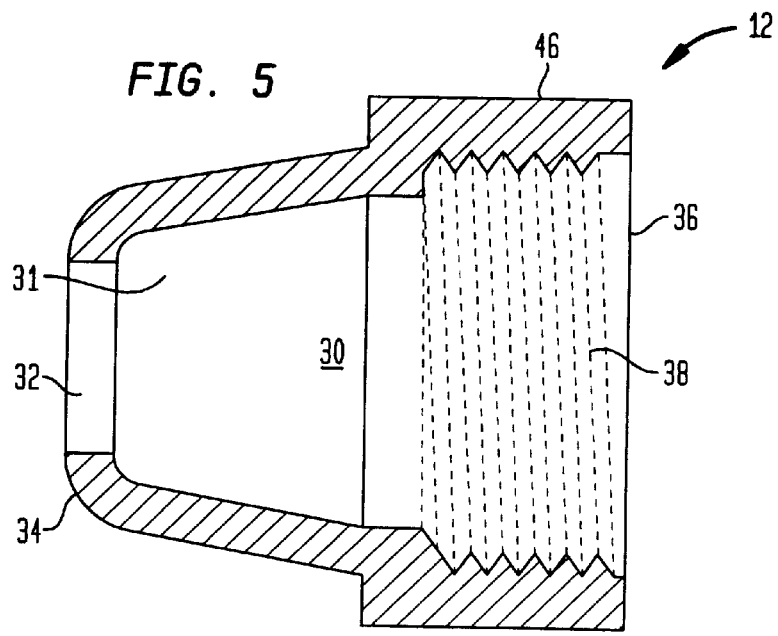
FIG. 5 is a side view of a fitting used in the cable sealing arrangement.
Figure 6:
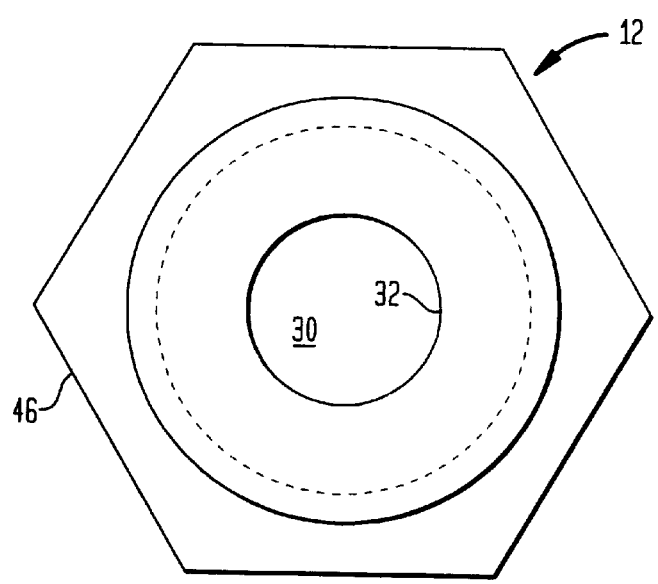
FIG. 6 is an end view of the fitting of FIG. 5.

With reference to FIGS. 5 and 6, the fitting 12 is generally tubular shaped with an inner passage 30 extending there through that may include tapered portion 31. An aperture 32 is defined in one end 34 of the fitting 12, sized to allow the passage therethrough of a cable. A rear opening 36 is formed in the other end of the fitting 12, which is preferably greater in size than the aperture 32. The inner passage 30 has a threaded section 38, that is preferably located in proximity to the rear opening 36.

Referring to FIG. 2, threads 40 are formed on outer surface 42 of the nut 16 that are configured to threadedly mate with the threaded section 38 of the fitting 12. The nut 16 is also formed with an inner passage 44 that is preferably sized to telescopically receive the second portion 20 of the sealing member 14, as described below.

Figure 7:
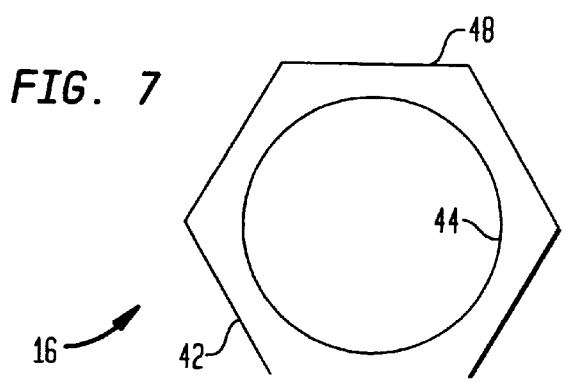
FIG. 7 is an end view of a nut used in the cable sealing arrangement.

It is preferred that the fitting 12 and the nut 16 have tool-engaging surfaces to facilitate assembly of the sealing arrangement 10. By way of non-limiting example, hexagonal surfaces 46 (FIG. 6) and 48 (FIG. 7) can, respectively, be formed on the fitting 12 and the nut 16 which are engageable by standard hex-shaped wrenches or pliers.

In use, and referring to FIG. 1, a cable C, about which a seal is to be formed, is threaded through the channel 22 of the sealing member 14. Separately, the fitting 12 is mounted to an enclosure E, or other location, through which the cable C is passing, and at which the seal is desired. With the cable C extending through it, the sealing member 14 is urged into the fitting 12 to come into shape-mating engagement with the tapered portion 31 abutting the tapered portion of the sealing member 14. Thereafter, the nut 16, which is also threaded over the cable C, is threadedly mounted to the fitting 12. Upon tightening of the nut 16, preferably relying on the hexagonal surfaces 46, 48, the nut 16 is forced into pressing engagement with the contact surface 28, while telescopically receiving the second portion 20. Further tightening of the nut 16 relative to the fitting 12 causes compression of the sealing member 14. Due to mutual engagement of the sealing member 14 with the fitting 12 and the nut 16, deformation of the sealing member 14 is limited axially, thus resulting in radial expansion of the sealing member 14. In other words, at least portions of the channel 22 are reduced in size, thereby defining a fluid-proof seal with the cable C, along with interengagement between the tapered surface 31 and the sealing member 14.

In addition to providing a tight seal, the second portion 22 acts as a guide for the cable C to prevent inadvertent, and potentially harmful, contact with the nut 16. Also, the second portion 22 provides strain relief for the cable C and limits the amount of engagement the cable C may have with the nut 16 when in use.

The sealing arrangement 10 can utilize other types of sealing members, besides the sealing member 14, including the slitted sealing members described below. Slitted sealing members are slitted along the length thereof so that portions of the sealing member can be displaced to allow for a cable to be passed through the displaced portions and urged into a channel of the sealing member. This process obviates the need for threading the sealing member along the entire length of the cable.

With reference to FIGS. 8–10, a first embodiment of a slitted sealing member is shown therein and designated with the reference numeral 100. The slitted sealing member 100 is formed with a body 102, that is preferably tapered, a first axial end 104, and a second axial end 106. The body 102 is tubular shaped with an inner surface 108 defining channel 110 that extends therethrough. The channel 110 is sized to allow the passage therethrough of a cable. Also, the body 102 has an outer surface 112.

A slit 114 extends between and through the inner surface 108 and the outer surface 112 and preferably it extends generally linearly therebetween. The slit 114 also extends between and through the first axial end 104 and the second axial end 106. It is preferred, however, that the slit 114 be not straight between the axial ends 104 and 106. Rather, the slit 114 preferably has two generally straight portions 116, 118 that are offset circumferentially by an angle α. A circumferential portion 120 joins the two straight portions 116, 118.

As a result of this configuration, two deformable arms 122, 124 are defined in the body 102.

The sealing member 100 is made of any resilient material known to those skilled in the art suitable for forming a fluid-proof seal about a cable. FIGS. 8 and 9 show the sealing member 100 in a natural, undeformed state. As described below, the arms 122, 124 need to be displaceable to allow for placement of a cable within the sealing member 100. Accordingly, the material of the sealing member 100 must allow for sufficient forced displacement of the arms 122, 124 to allow for passage of a cable therebetween, with the arms in displaced states, and yet have sufficient memory to cause the arms 122, 124 to return substantially to their respective natural states, after removal of the displacing force. FIG. 10 is a schematic of the body 102 laid flat.

Figure 11:
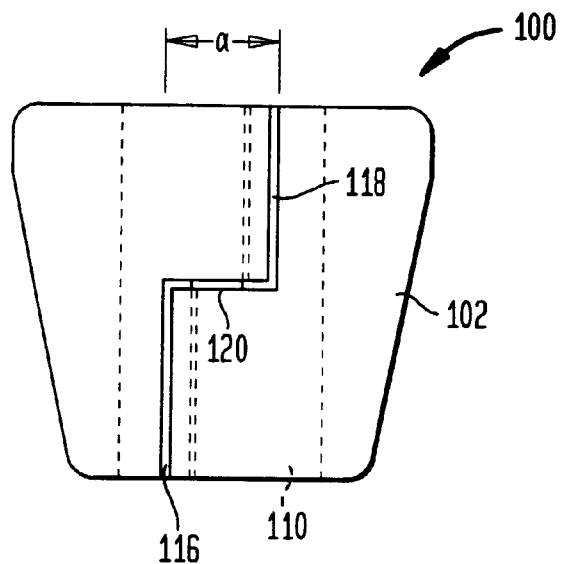
FIG. 11 is a variation of the first embodiment of the slitted sealing member wherein portions of the slit are not diametrically opposed.
Figure 12:
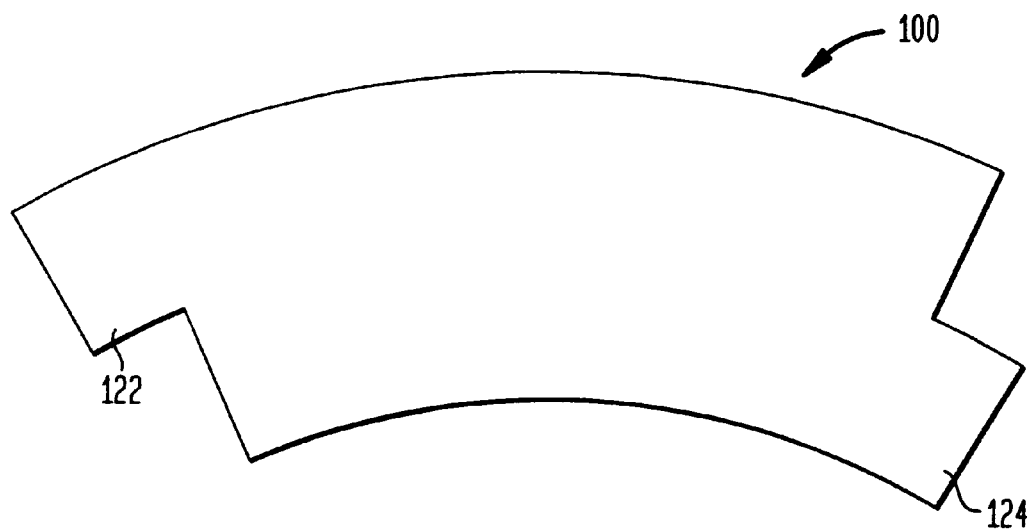
FIG. 12 is a plan view of the body of the slitted sealing member of FIG. 11 in a flat state.
Figure 13:
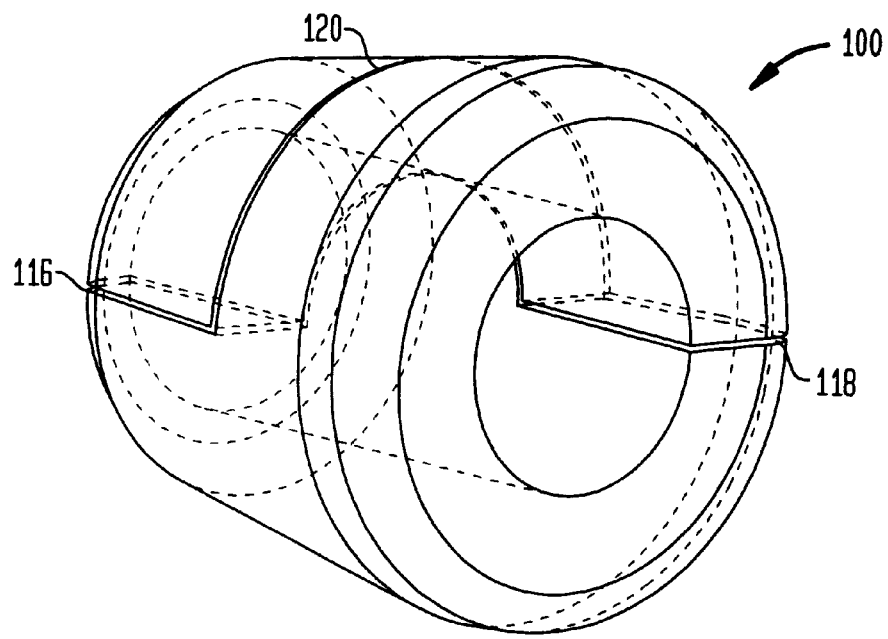
FIG. 13 is an isometric view of the sealing member of FIG. 8.
Figure 14:
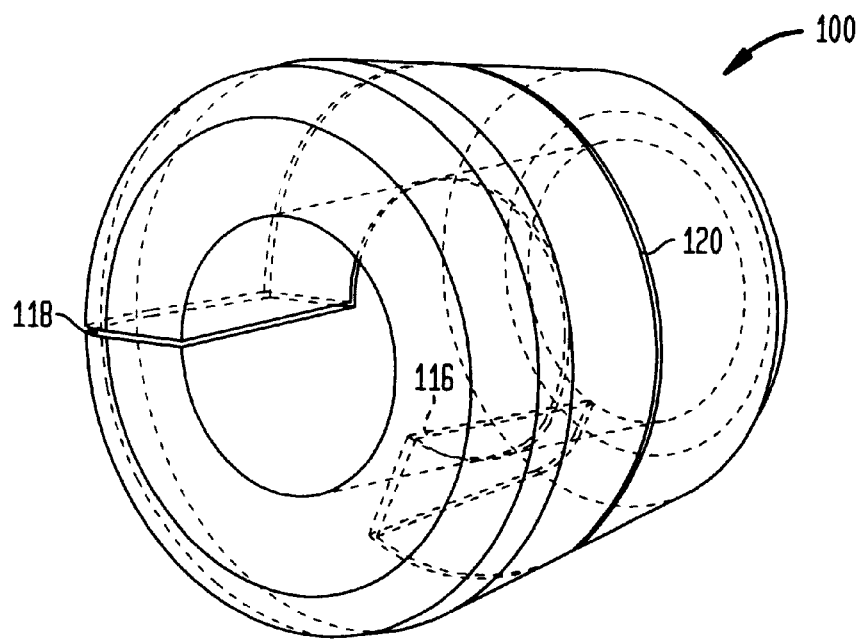
FIG. 14 is an isometric view of another variation of the first embodiment of the slitted sealing member wherein an obtuse angle is defined between portions of the slit.

As shown in FIG. 9, the angle α can be 180° so that the straight portions 116, 118 of the slit 114 extend in diametrically opposite directions from the channel 110. Alternatively, as shown in FIGS. 11 and 12, the angle α can be acute so the straight portions 116, 118 of the slit 114 are closer (and the length of the arms 122, 124 are shorter) than where the angle α is 180°; alternatively, the angle a can be obtuse. FIGS. 13 and 14 show variations of the sealing member 100 in perspective, wherein FIG. 13 shows the straight portions 116, 118 being diametrically opposed, whereas, FIG. 14 shows the straight portions 116, 118 defining an obtuse angle therebetween (the circumferential portion 120 sweeps an obtuse angle of greater than 180° between the straight portions 116, 118).

Figure 15:
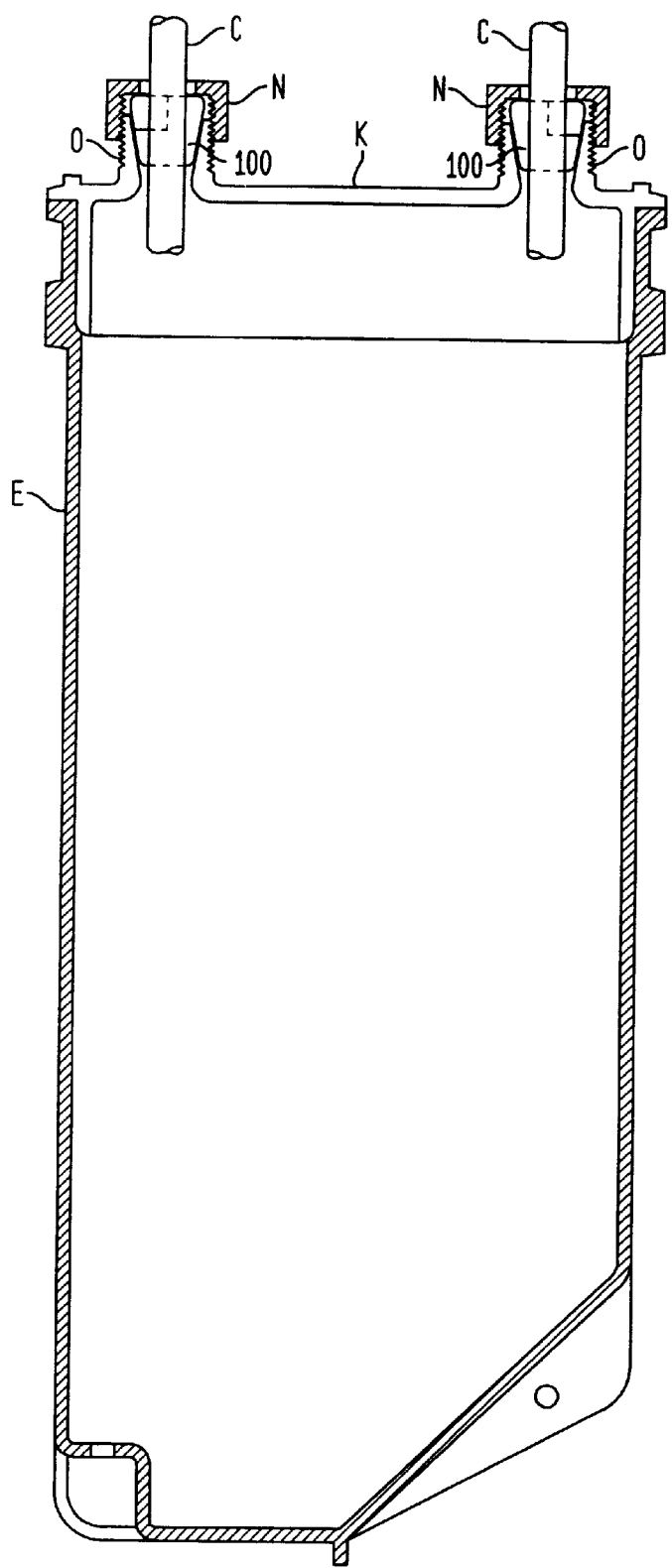
FIG. 15 is a schematic of an enclosure shown to have two cables passing therein with a slitted sealing member being about each of the cables.
Figure 16:
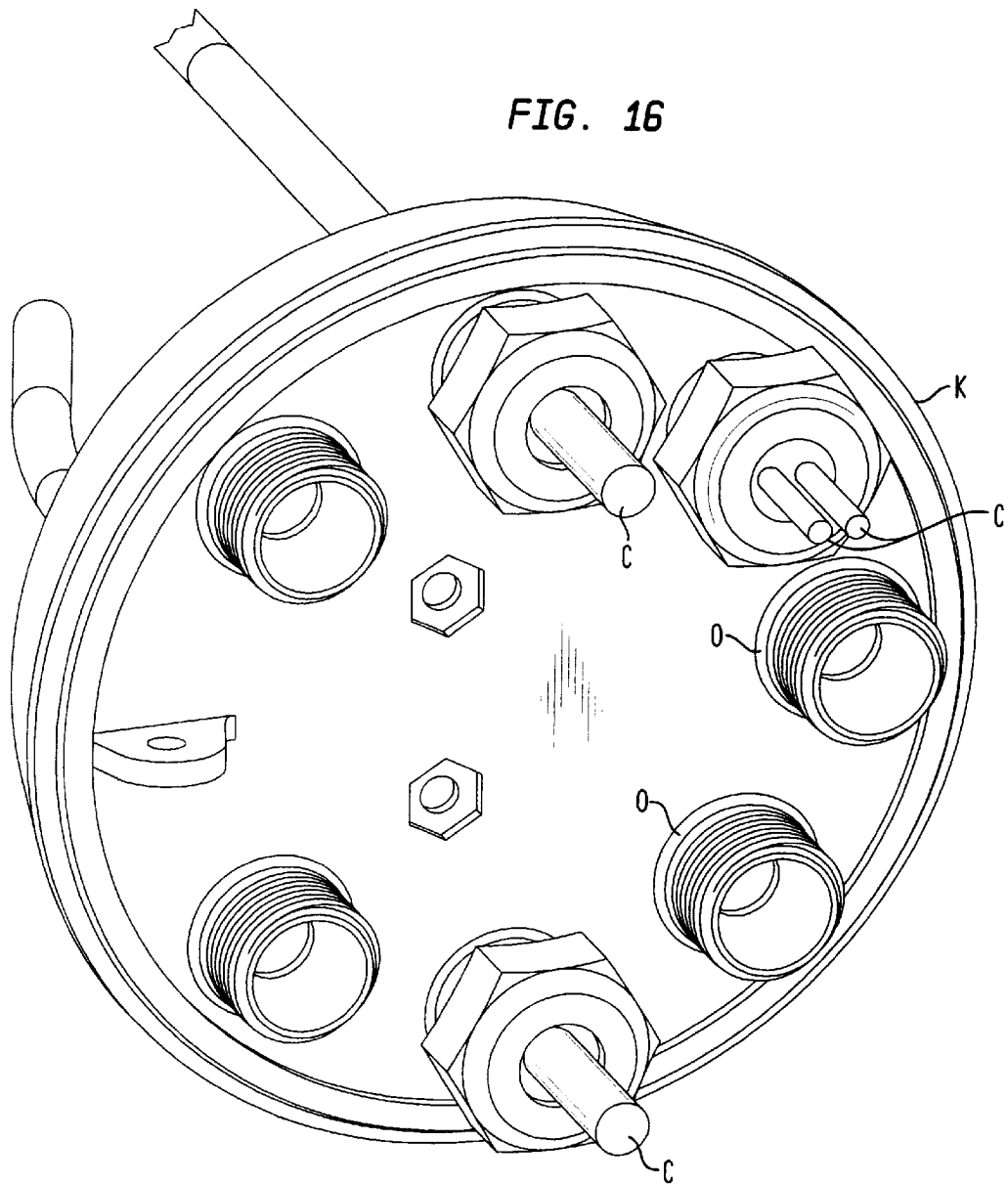
FIG. 16 is a perspective view of the cover for the enclosure depicted in FIG. 15.

The sealing member 100 can be used in the sealing arrangement 10 described above, or in other applications where it is desired to limit the ingress of fluid about a cable C, such as at a cable's point of entry into an enclosure. By way of non-limiting example, reference is made to FIG. 15 wherein a cover K and a cylindrical enclosure E are depicted. The cylindrical enclosure E, and the contents thereof, are not illustrated in full detail to simplify the disclosure herein. As more clearly shown in FIG. 16, cables C pass through threaded openings O formed in the cover K. A sealing member, such as the sealing member 100, is disposed within each of the threaded openings O about respective cables C, to provide fluid-proof seals thereabout. Nuts N are used to press against and hold the sealing members within the threaded openings O.

Figure 17:
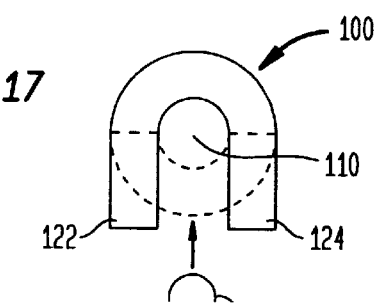
FIG. 17 is a schematic showing forced displacement of the arms of a slitted sealing member and the lateral placement of a cable into the channel of the sealing member.

To more fully explain the mounting of one of the sealing members 100 about one of the cables C, reference is made to FIG. 17 wherein arms 122, 124 of the sealing member 100 are shown in solid lines in deformed states with the channel 110 being exposed to receive the cable C. It is preferred that the arms 122, 124 be forcibly displaced by being pulled. Once the cable C is inserted between the deformed arms 122, 124 into the channel 110, the displacing force is removed from the arms 122, 124, thereby allowing the arms 122, 124 to return to their natural, undeformed states shown in dashed line. It is preferred that the channel 110 be sized smaller than the cable C to have a tight engagement therewith in a natural state. Advantageously, the invention of the subject application obviates the effort of threading the sealing member 100 along the entire length of the cable C.

Additionally, the irregular, non-linear shape of the slit 114 in the axial direction between the axial ends 104, 106, defined by the circumferentially-offset straight portions 116, 118, creates a longer leakage path for fluid to traverse in migrating through the sealing member 100. The longer leakage path restricts the amount of fluid that can pass through the sealing member 100.

Figure 18:
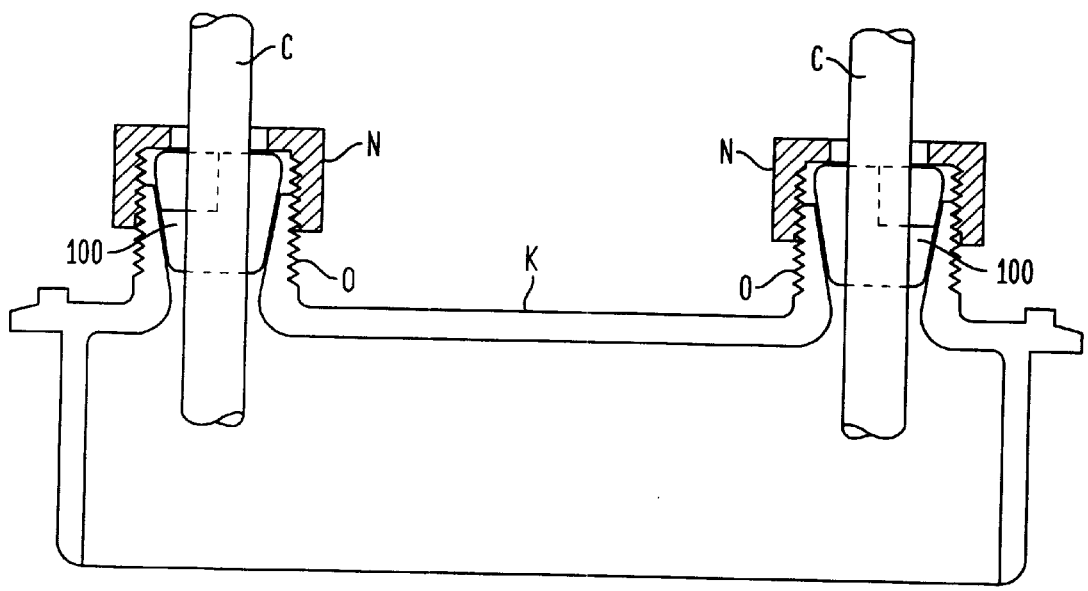
FIG. 18 is a side cross-sectional view of the cover of FIG. 16.

With the sealing member 100 being mounted onto the cable C, the cable C is threaded through one of the threaded openings O and the sealing member 100 is urged into contact with the threaded opening O, as shown in FIG. 18. As with the sealing arrangement 10 described above, the tightening of the nut N results in radial expansion of the sealing member 100 and a fluid-proof seal being defined between the cable C and the threaded opening O. Radial expansion is caused by the limited ability of the sealing member 100 to axially expand under compression of the nut N during tightening—axial expansion is limited by the nut N and the interengagement of the sealing member 100 and the threaded opening O.

Figure 19:
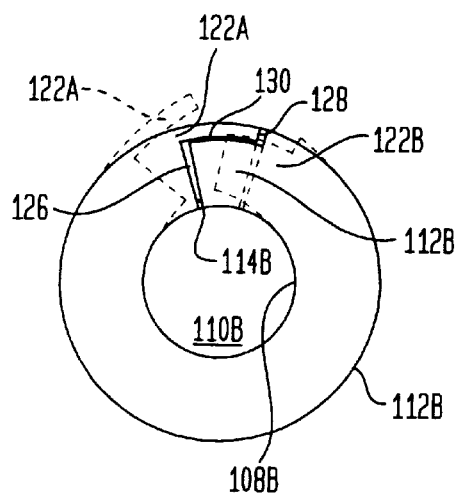
FIG. 19 is a top view of a second embodiment of a slitted sealing member formed to receive a single cable.
Figure 20:
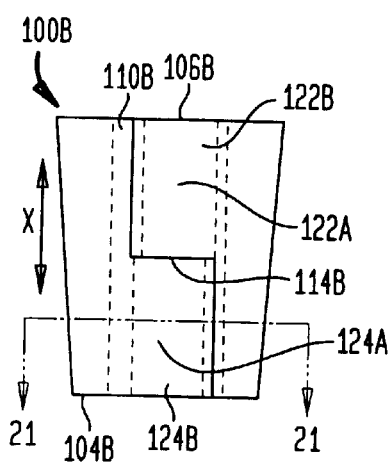
FIG. 20 is a side view of the sealing member of FIG. 19.
Figure 21:
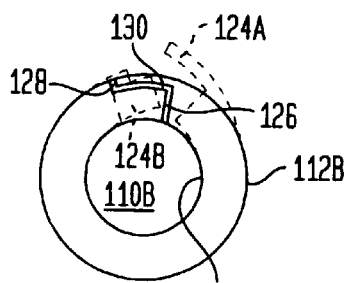
FIG. 21 is a cross sectional view of the sealing member taken along line 21—21 of FIG. 20.

Referring to FIGS. 19–21, a second embodiment of a slitted sealing member 100B is shown. As in the first embodiment, a slit 114B is formed to extend between axial ends 104B and 106B. Here, however, the slit 114B does not extend linearly between and through the inner surface 108B and the outer surface 112B. Rather, the slit 114B has a first radial portion 126, a second radial portion 128, and a circumferential portion 130 extending therebetween. The slit 114B is not formed constantly between the axial ends 104B and 106B. Instead, the slit 114B changes direction in the axial direction X due to the circumferential portion 130. As a result, the shape of the slit 114B defines two sets of overlapping arms 122A, 122B and 124A, 124B. Due to the non-linear shape of the slit 114B in the axial direction X, the slit 114B limits the amount of moisture that may migrate through the sealing member 100B in the axial direction X. Additionally, the overlapping relationship of the arms 122A, 122B and 124A, 124B limits the passage of moisture therethrough.

To mount a cable within the sealing member 100B, the arms 122A, 122B and 124A, 124B are displaced as shown schematically in FIGS. 19 and 21 in dashed lines to expose the channel 110B. The arms 122A, 122B are located in proximity to the second axial end 106B, whereas, the arms 124A, 124B are located in proximity to the first axial end 104B. With the channel 110B being exposed, a cable can be urged therein to laterally between the displaced arms 122A, 122B and 124A, 124B. The release of the displacing force permits the arms 122A, 122B and 124A, 124B to regain memory and define a tight fluid-proof seal about the cable. The same material and design considerations discussed with respect to the first embodiment are applicable here as well with the further embodiments discussed below. Also, the sealing member 100B is utilized, and functions, in the same manner as the first embodiment. The further embodiments are utilized and function in the same manner as the first embodiment, unless noted otherwise.

Figure 22:
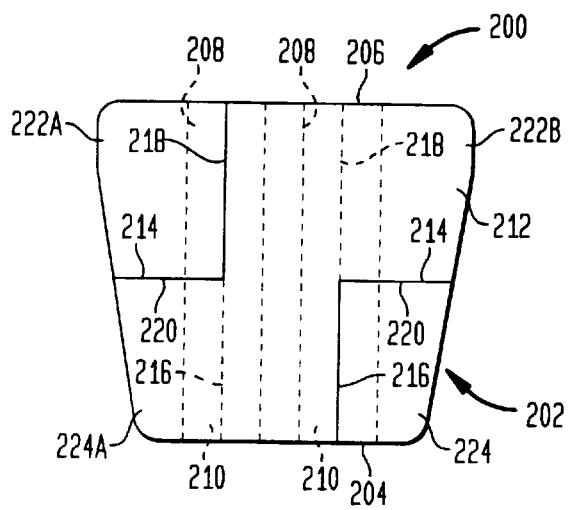
FIG. 22 is a front view of a third embodiment of a slitted sealing member formed to receive two cables.
Figure 23:
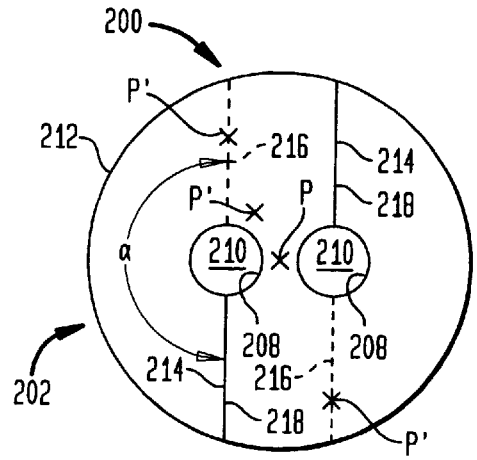
FIG. 23 is a top view of the sealing member of FIG. 22.
Figure 24:
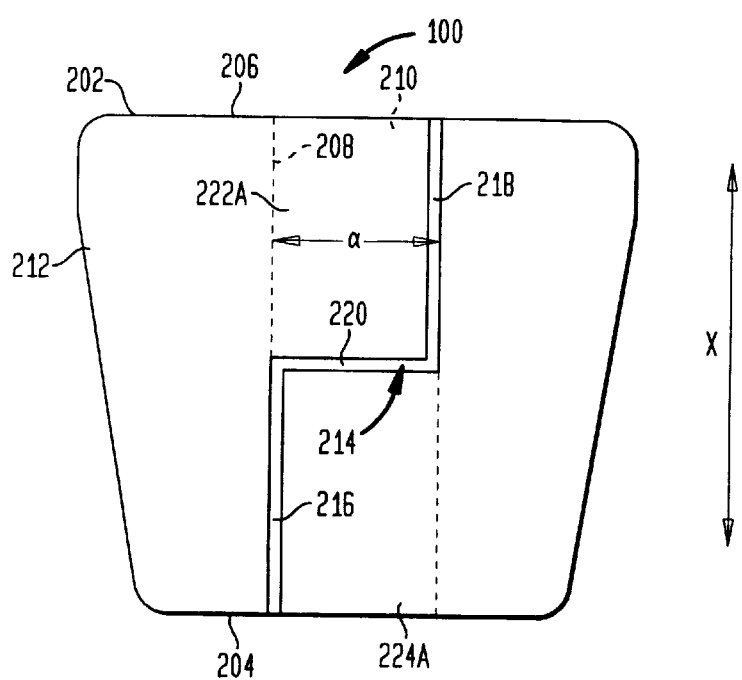
FIG. 24 is a side view of the sealing member of FIG. 22.

Referring to FIGS. 22–24, a third embodiment of a slitted sealing member is shown and designated with the reference numeral 200. In contrast to the first two embodiments, the third embodiment is formed to define seals about two or more cables, rather than a single cable.

The sealing member 200 has a body 202, which is preferably tapered, a first axial end 204, and a second axial end 206. A plurality of inner surfaces 208 are formed in the body 202 to define channels 210. It is preferred that the channels 210 be generally parallel and be each formed to accommodate a cable.

The body 202 has an outer surface 212, and slits 214 which are formed to respectively extend between and through each of the inner surfaces 208 and the outer surface 212, with the slits 214 preferably being generally linear between the respective inner surface 108 and the outer surface 212. The slits 214 are formed to allow for displacement of portions of the body 202 and for exposure of the channels 210. Preferably, the slits 214 are not linearly formed in the axial direction X between the axial ends 204 and 206. Rather, each of the slits 214 is formed similarly to the slit 114 described above. In particular, each of the slits 214 is formed with two circumferentially offset straight portions 216, 218 which are respectively joined by a circumferential portion 220. The straight portions 216, 218 are separated by an angle α, which can be 180° (as shown in FIG. 23), acute (as shown in FIG. 24), or obtuse. As a result of this configuration, a pair of arms 222A, 224A and 222B, 224B is defined adjacent to each of the channels 210.

In use, the arms 222A, 224A and 222B, 224B can be respectively displaced to allow for the placement of a cable into each of the respective channels 210. The displacement is similar to that described above with respect to the first and second embodiments.

It should also be noted that the arms 222A, 224A and the arms 222B, 224 are displaceable about a common pivot point P. Because of the common pivot point, the accommodation of several cables may cause the body 202 to be stiffer than where one cable is accommodated. Thus, the insertion of a second cable may be more difficult than the first cable, and so on. To minimize the stiffening effect caused by accommodated cables, it is desired that the channels 210 be sufficiently spaced apart. Alternatively, although not shown, the channels 210 and respective arms 222A, 224A and 222B, 224B may be arranged to avoid sharing a common pivot point, such as for example with an unsymmetrical arrangement (e.g., pivot points P' can be located off-center).

Figure 25:
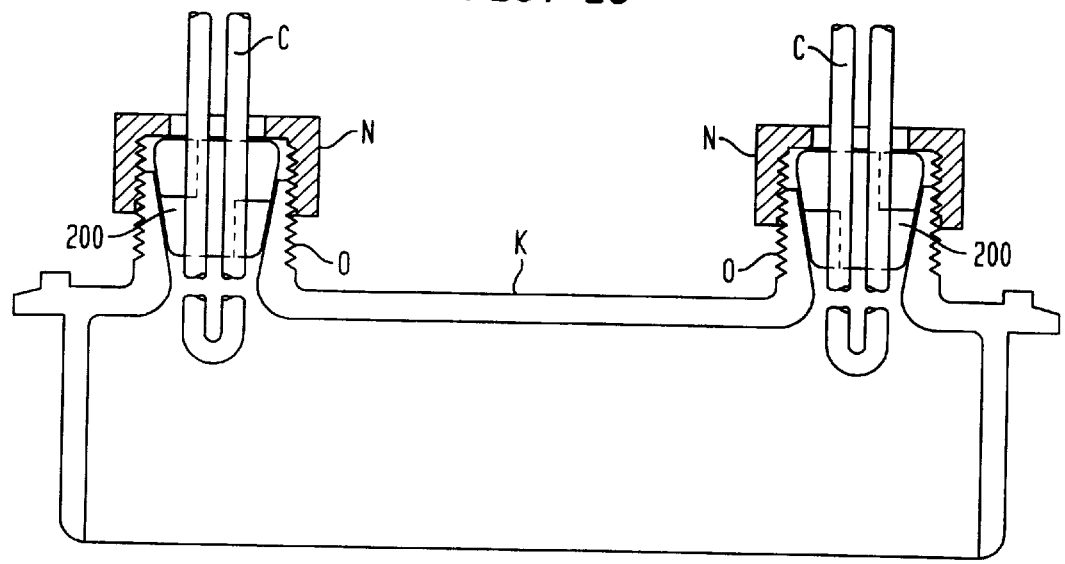
FIG. 25 is a cross-sectional view of the cover of the enclosure wherein two single cables are respectively double threaded through sealing members of the third embodiment.

As shown in FIG. 25, the sealing member 200 may be used to double thread a cable C, or, although not shown, to simultaneously accommodate parallel cables in the cover K, previously described. As with the first and second embodiments, the sealing member 200 is caused to be seated in the opening O, and caused to be deformed to form fluid-proof seals about the cable(s) C through the tightening of a nut N onto the opening O.

Figure 26:
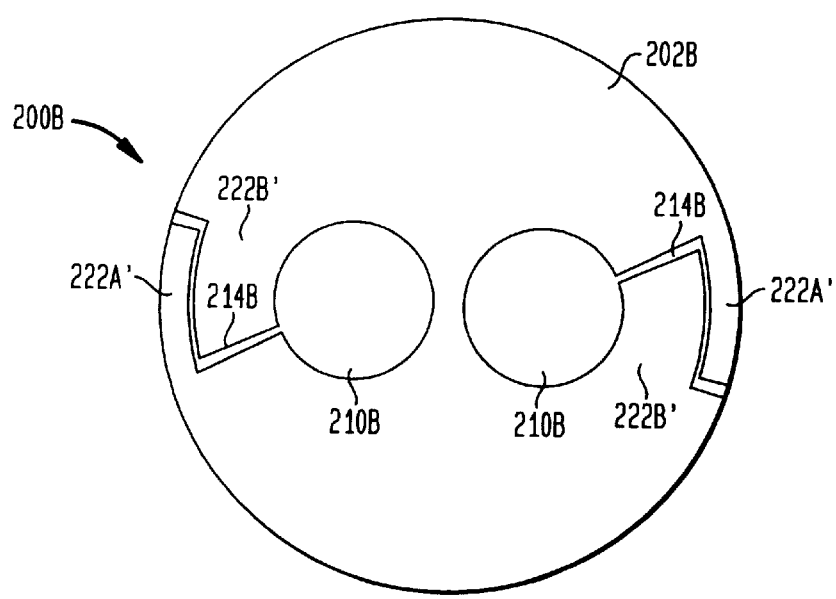
FIG. 26 is a top view of a fourth embodiment of a slitted sealing member formed to receive two cables.
Figure 27:
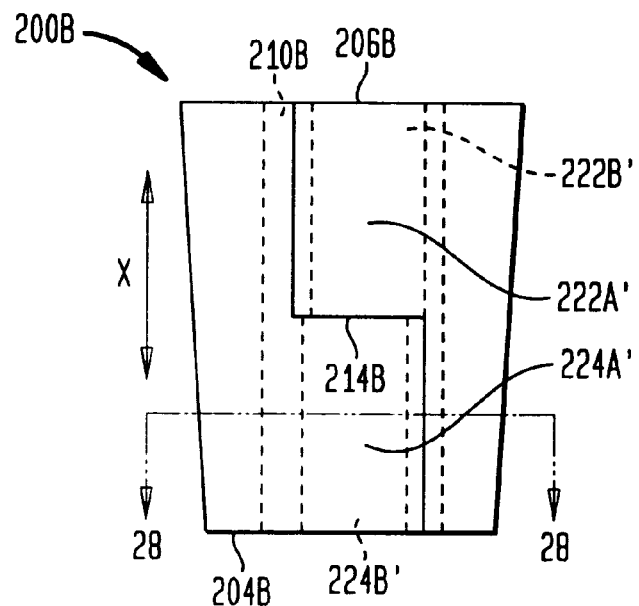
FIG. 27 is a side view of the sealing member of FIG. 26.
Figure 28:
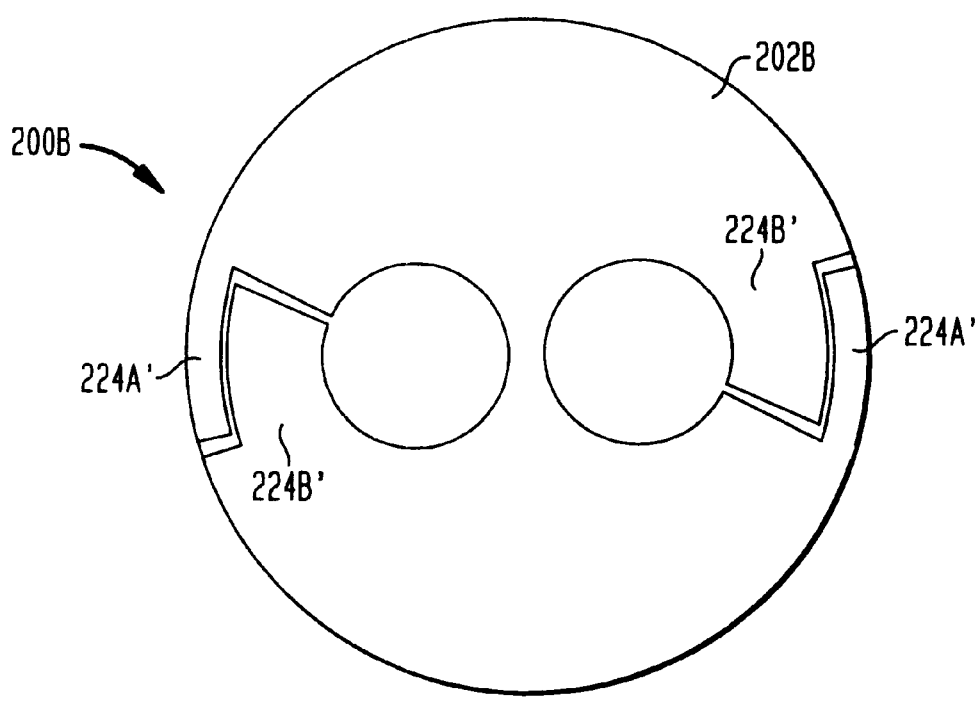
FIG. 28 is a cross-sectional view of the sealing member taken along line 28—28 of FIG. 27.

Referring to FIGS. 26–28, a fourth embodiment of a slitted sealing member is depicted and designated with the reference numeral 200B. As with the third embodiment of a slitted sealing member, the fourth embodiment is able to accommodate a plurality of cables. The sealing member 200B varies from the sealing member 200 of the third embodiment in the same manner the sealing member 100B of the second embodiment varies from the sealing member 100 of the first embodiment. Specifically, the sealing member 200B is formed with body 202 having overlapping arms 222A', 222B' and 224A', 224B' that are respectively defined by slits 214B. The overlapping arms 222A', 222B' and 224A', 224B' are displaceable in the same manner as the overlapping arms of the second embodiment described above to expose the channels 210B. It is preferred that the channels 210B be parallel.

Referring to FIGS. 29–33, a fifth embodiment of a slitted sealing member is shown and designated with the reference numeral 300. The sealing member 300 has an elongated member 302 that is helically wound to define a generally tubular body 304, which is preferably tapered. The body 304 has an inner surface 306, which defines a channel 308, and an outer surface 310. The helical winding of the elongated member 302 defines a spiral-shaped slit 312 generally along the length of the body 304, with the slit 312 extending between and through the inner surface 306 and the outer surface 310.

Figure 29:
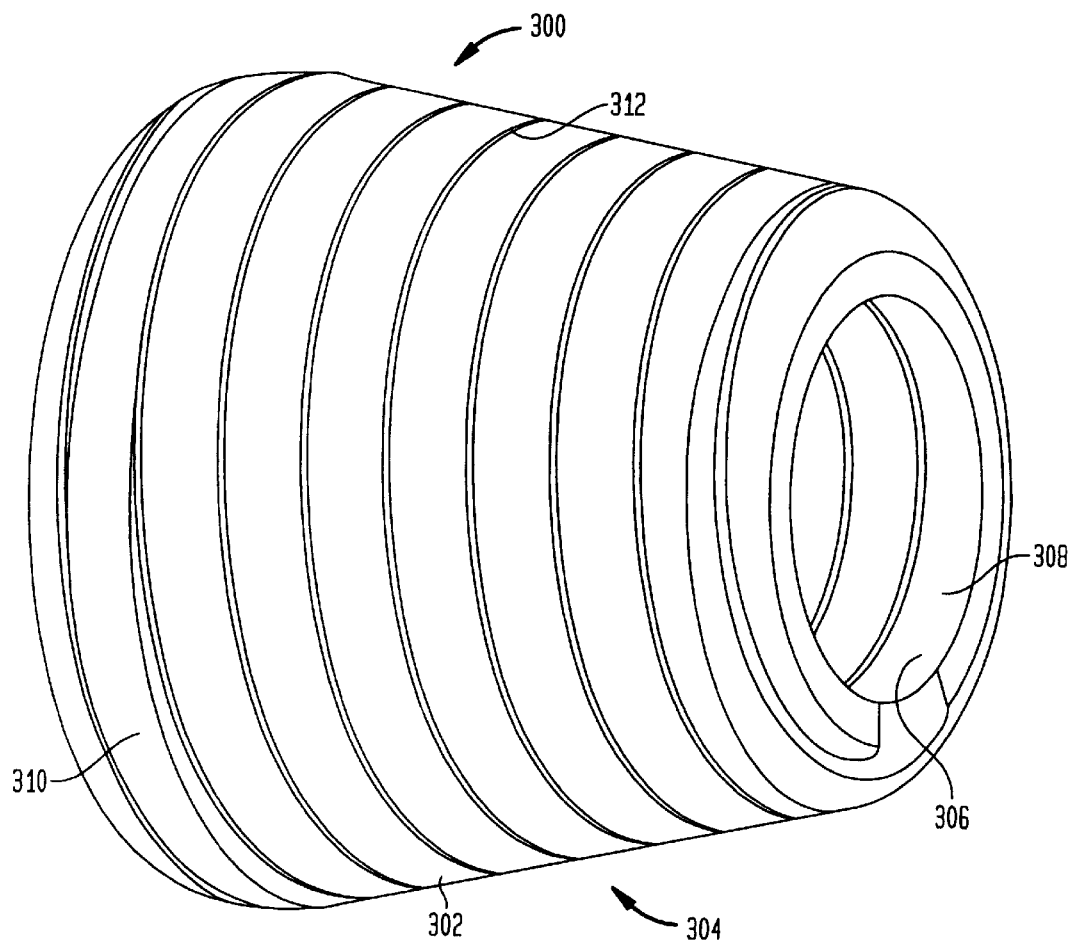
FIG. 29 is a perspective view of a fifth embodiment of a sealing member which is formed with a helically wound elongated member to define a generally tubular body.
Figure 30:
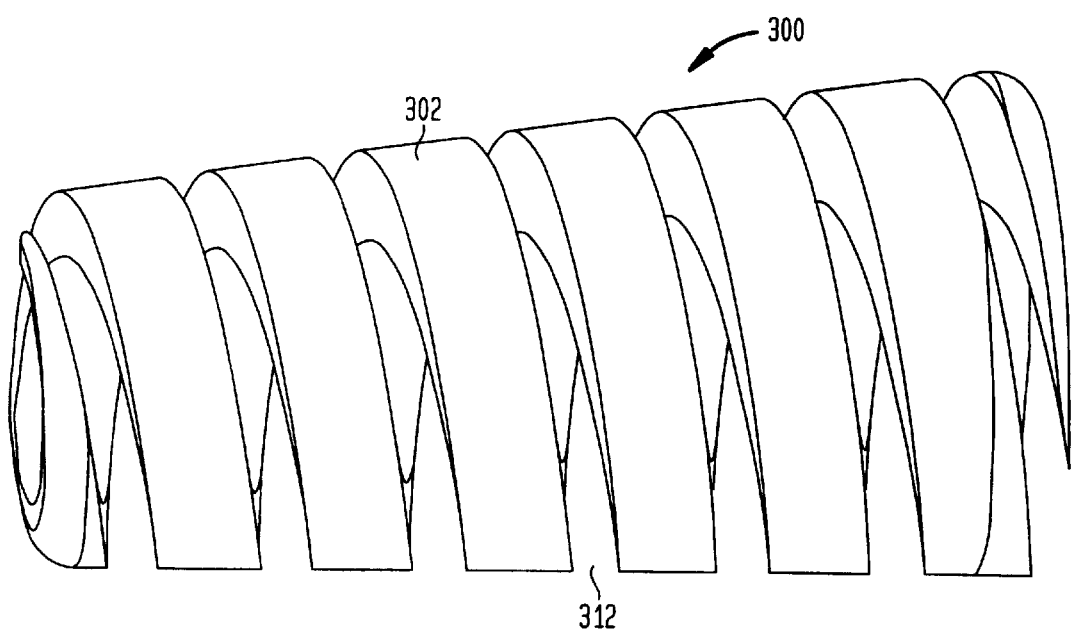
FIG. 30 is a perspective view of the fifth embodiment of the sealing member shown in an elongated state.
Figure 31:
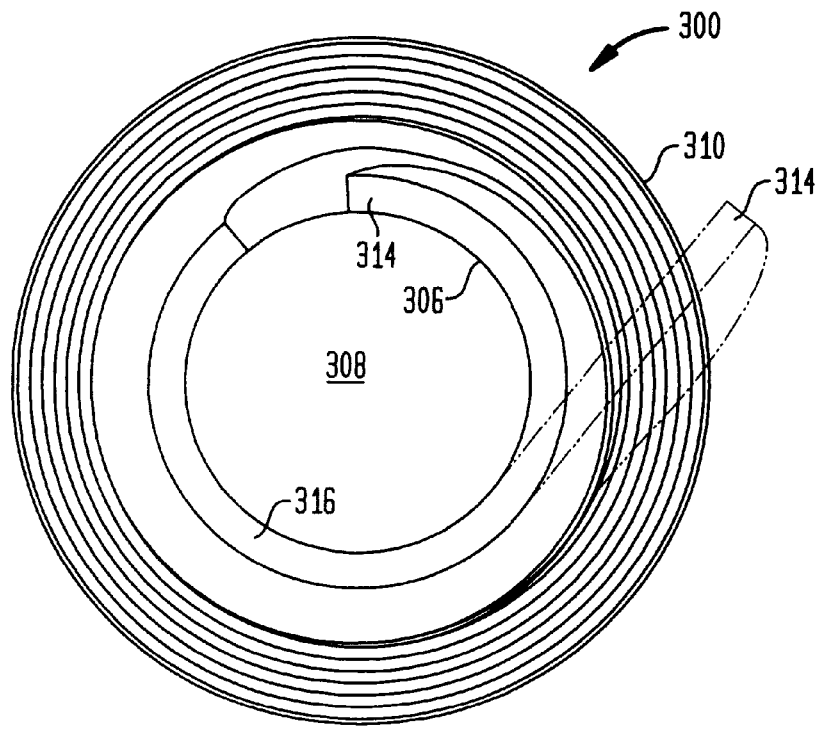
FIG. 31 is a bottom plan view of the fifth embodiment of the sealing member.
Figure 32:
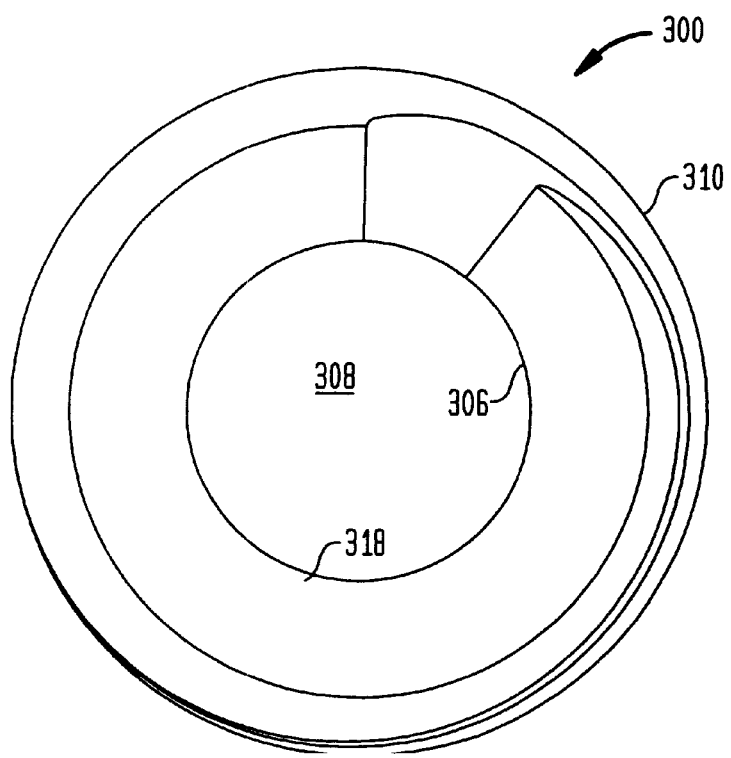
FIG. 32 is a top plan view of the fifth embodiment of the sealing member.

As shown in FIG. 30, the sealing member 300 can be axially elongated with the elongated member 302 being extended from its natural state (natural state is shown in FIG. 29). The sealing member 300 may be threaded onto a cable; or, alternatively, the elongated member 302 is unwound into a deformed state, wound about the cable, and released into its natural state to provide a tight fluid-proof seal about the cable. FIG. 31 shows end 314 of the elongated member 302 being displaced. As with prior embodiments, the elongated member 302 is formed with memory to regain its natural state after being displaced.

Figure 33:
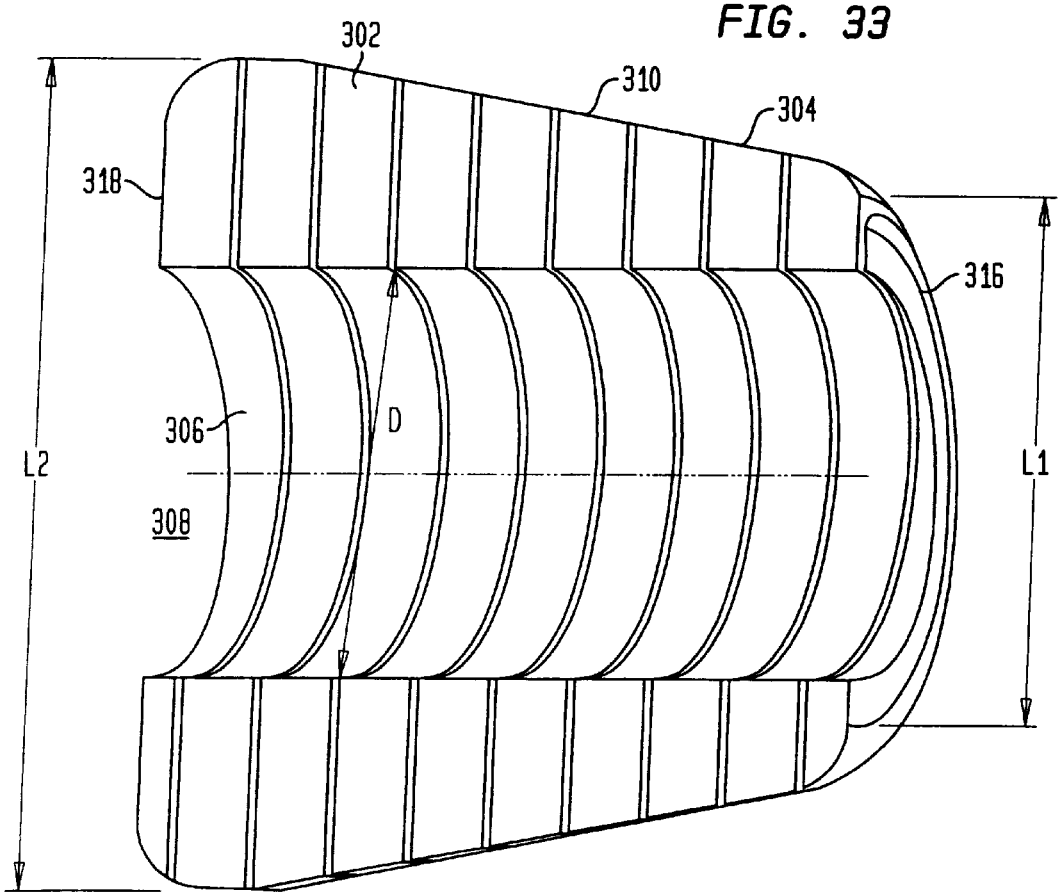
FIG. 33 is a cross-sectional view of the fifth embodiment of the sealing member.

With reference to FIG. 33, it is preferred that the body 304 have a generally tapered shape. To achieve the tapered shape, it is preferred that the elongated member 302 be formed with a gradually increasing thickness throughout the length thereof. Thus, the channel 308 defines a constant diameter D throughout the length thereof, whereas, the outer surface 310 defines various diameters, including a diameter L1 at end 316 of the body 304 that is less than a diameter, L2 defined at end 318 of the body 304.

Figure 34:
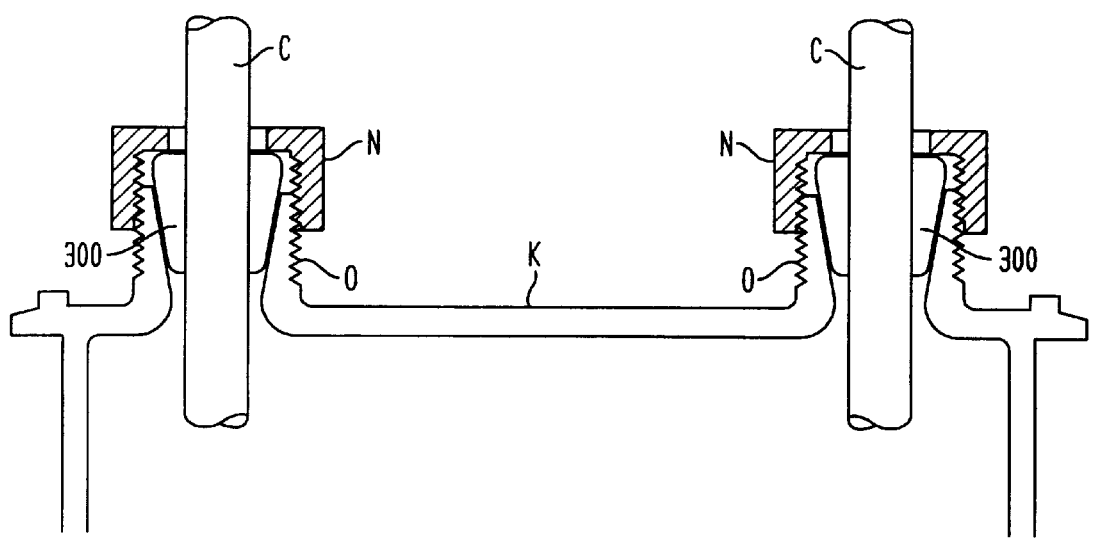
FIG. 34 is a cross-sectional view of a cover of an enclosure wherein cables respectively pass through sealing members formed in accordance with the fifth embodiment of the subject invention.

The tapered shape of the body 304 allows for the sealing member 300 to be inserted into a the threaded opening O of the cover K as shown in FIG. 34, and described above with respect to the prior embodiments. As with the prior embodiments, the sealing members 300 are caused to be radially expanded in the threaded openings O by the tightening of the nuts N, thereby resulting in the sealing members 300 forming fluid-proof seals about the cables C.

Figure 35:
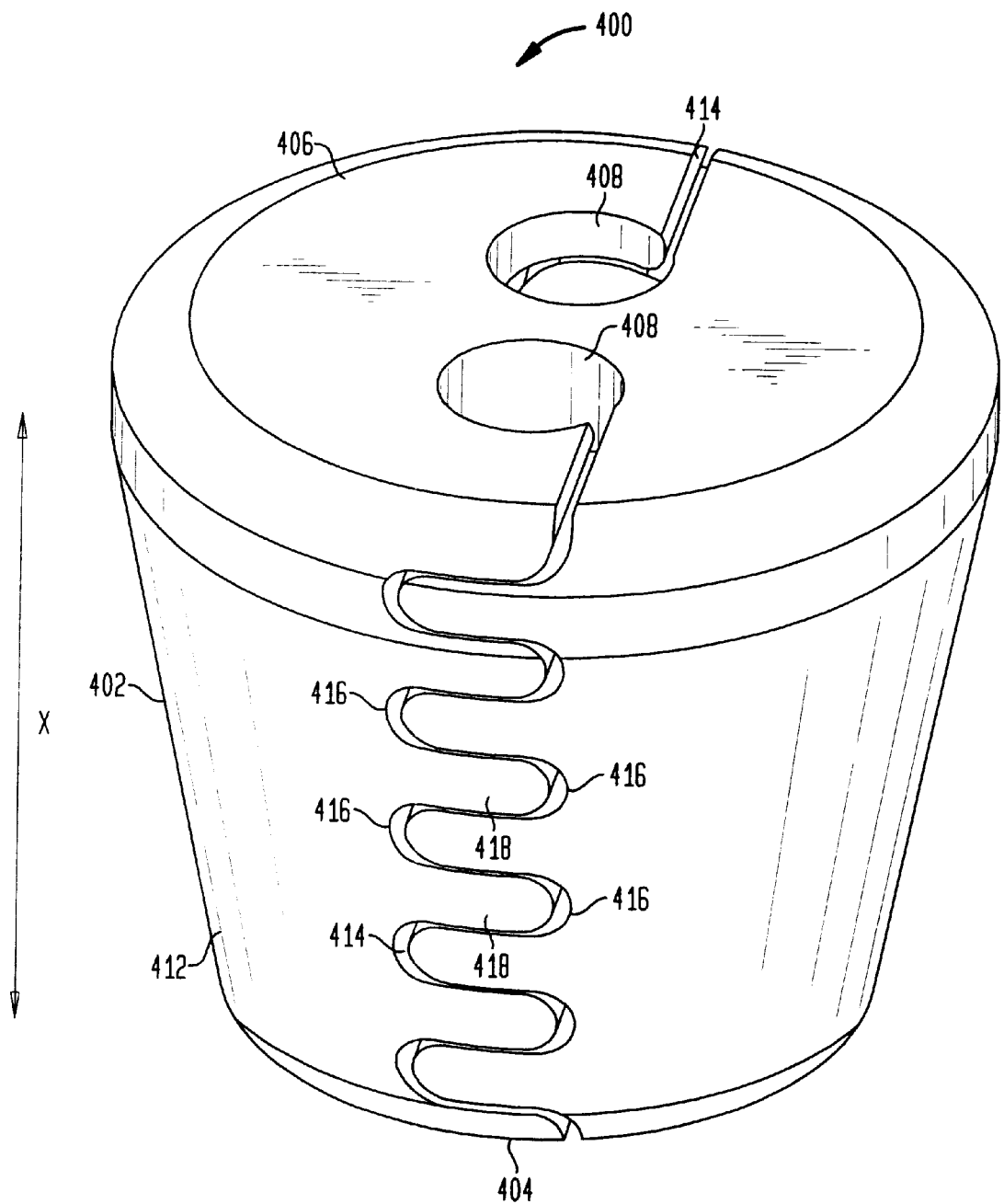
FIG. 35 is a perspective view of a sixth embodiment of a sealing member where a slit is formed serpentitiously between axial ends thereof.
Figure 36:
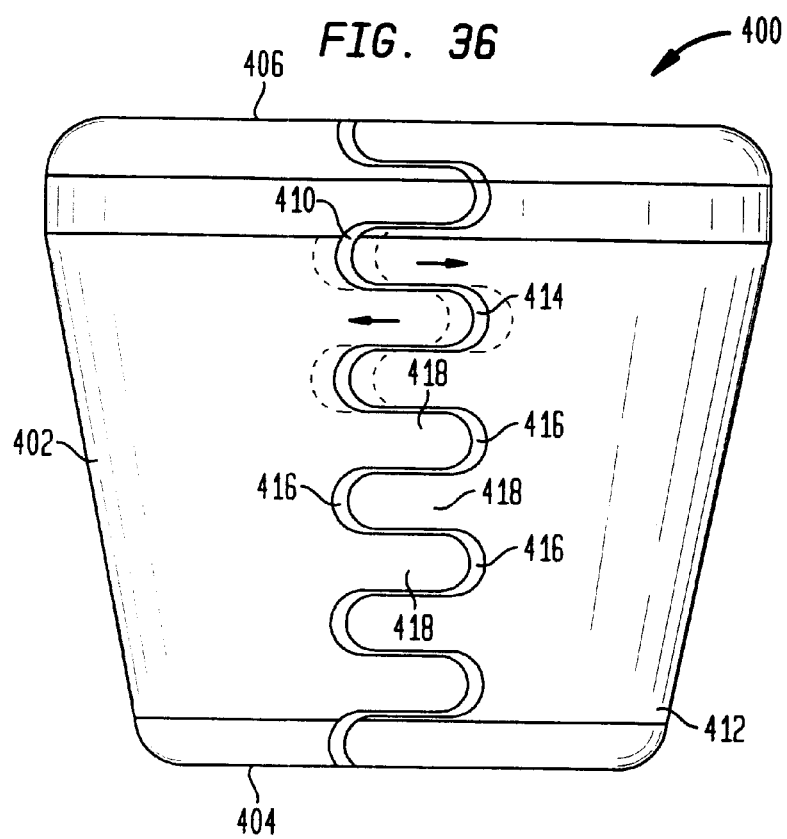
FIG. 36 is a side view of the sixth embodiment of the sealing member.
Figure 37:
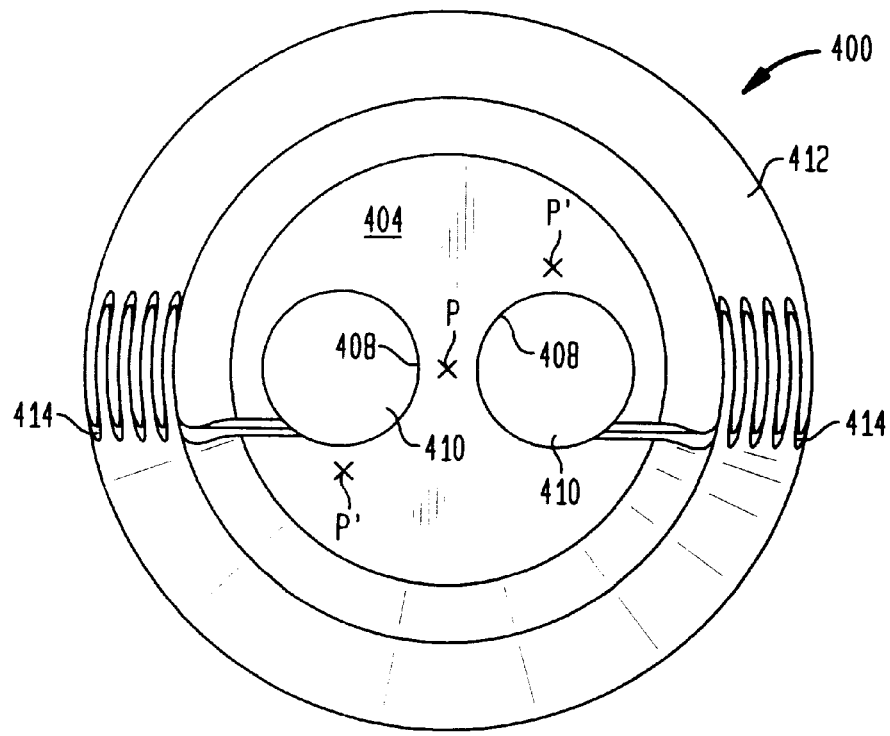
FIG. 37 is a bottom plan view of the sixth embodiment of the sealing member.

With reference to FIGS. 35–37, a sixth embodiment of a slitted sealing member is shown and designated with the reference numeral 400. Specifically, the sealing member 400 has a generally tubular body 402, with a first axial end 404 and a second axial end 406. Preferably, the sealing member 400 is formed to accommodate a plurality of cables. Alternatively, the sealing member 400 can be formed to accommodate a single cable. A plurality of inner surfaces 408 are formed in the body 402 which corresponds with the number of cables that are to be accommodated. Each of the inner surfaces 408 defines a channel 410 that extends the full axial length of the sealing member 400. Preferably, the channels 410 are parallel. The sealing member 400 also has an outer surface 412.

A slit 414 extends between and through each of the inner surfaces 408 and the outer surface 412. Additionally, each of the slits 414 is serpentitious in the axial direction X between the axial ends 404, 406. Specifically, each of the slits 414 has a plurality of turns 416 formed therein which define interengaging castellated fingers 418 in the body 402, which interengage with the sealing member 400 being in a natural state. To place a cable in one of the channels 410, the fingers 418 defined by one of the slits 414 are displaced, as shown in dashed lines in FIG. 36, to expose the respective channel 410, thereby allowing for a cable to be laterally inserted therein to. As shown in the Figures, displacement of the slits 414 occurs about a common pivot point P. Alternatively, the channels 410 can be arranged to pivot about off-enter pivot points P'. As with the other embodiments, the sealing member 400 obviates the need for threading a sealing member along the length of a cable. With the subject invention, the slitted sealing member is simply mounted laterally at a desired location of a cable.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A sealing arrangement for sealing about a cable, said arrangement comprising:

a tubular fitting having an inner surface defining a inner passage extending therethrough dimensioned to receive a cable;

a unitary sealing member having first and second portions, and a channel extending therethrough formed to accommodate a cable, said first portion having first and second ends, said first end being formed to be received in said inner passage with a portion of said sealing member being formed to shape-matingly engage said fitting, said second portion extending from said second end of said first portion, said second portion being smaller than said first portion such that said second end of said first portion defines a contact surface unobstructed by said second portion; and, a nut mountable to said fitting, said nut having a compression surface for engaging said contact surface with said first end of said first portion being received in said fitting;

wherein said sealing member comprises a body having a first inner surface and an outer surface, said first inner surface defining a first channel extending the length of said body, wherein a first slit is formed to extend between and through said first inner surface and said outer surface such that portions of said body adjacent to said first slit may be displaced to expose portions of said first channel.

2. A sealing arrangement as in claim 1, wherein said sealing member has first and second axial ends, said first slit extending between and through said first and second axial ends.

3. A sealing arrangement as in claim 2, wherein portions of said first slit are circumferentially offset.

4. A sealing arrangement as in claim 1, wherein said body having a second inner surface defining a second channel extending the length of said body, wherein a second slit is formed to extend between and through said second inner surface and said outer surface such that portions of said body adjacent said second slit may be displaced to expose portions of said second channel.

5. A sealing arrangement as in claim 4, wherein said displacement of said portions of said body adjacent said first slit and said displacement of said portions of said body adjacent said second slit occur about a common pivot.

6. A sealing arrangement as in claim 1, wherein said first slit has a first portion and a second portion, said first and second portions extending in diametrically opposite directions from said first channel.

7. A sealing arrangement as in claim 2, wherein said first slit is formed to extend serpentitiously between said first and second axial ends.

8. A sealing arrangement as in claim 2, wherein said first slit has a first portion which extends in an axial direction between said first and second axial ends, a second portion which extends in a circumferential direction that is transverse to said axial direction, and a third portion which extends in a said axial direction.

9. A sealing arrangement as in claim 1, wherein at least a portion of said first slit extends generally linearly between said first inner surface and said outer surface.

10. A sealing arrangement as in claim 1, wherein at least a portion of said first slit extends non-linearly between said first inner surface and said outer surface.

11. A sealing arrangement as in claim 10, wherein at least a portion of said first slit separates overlapping portions of said body.

* * * * *